United States Patent [19]

Wu

[11] 4,065,666
[45] Dec. 27, 1977

[54] MULTIPLY-DIVIDE UNIT

[75] Inventor: Chin Tao Wu, North Brunswick, N.J.

[73] Assignee: RCA Corporation, New York, N.Y.

[21] Appl. No.: 732,866

[22] Filed: Oct. 15, 1976

[51] Int. Cl.² ............................................. G06F 7/54
[52] U.S. Cl. ................................... 364/759; 364/766
[58] Field of Search ........................................ 235/164

[56] References Cited

U.S. PATENT DOCUMENTS

| | | | |
|---|---|---|---|
| 3,795,880 | 3/1974 | Singh et al. | 235/164 |
| 3,803,393 | 4/1974 | Wang | 235/164 |
| 3,956,621 | 5/1976 | Booth | 235/164 |
| 3,961,750 | 6/1976 | Dao | 235/164 |

*Primary Examiner*—Jerry Smith
*Attorney, Agent, or Firm*—H. Christoffersen; Samuel Cohen; Carl M. Wright

[57] ABSTRACT

Apparatus and method for selectively multiplying or dividing operands by combined add-shift right operations or subtract-shift left operations, the latter preceded and followed by a pre-shift to the left and post-shift to the right. An array of register stages, including an adder, is arranged to shift the register contents and adder output signals selectively right or left, depending on the operation and the value of the least significant bit of the controlling operand. The loading of operands and retrieval of results can be accomplished as if the unit were a memory device, making it especially useful for small computers and microprocessors. The array is structured to permit cascading identical units in a regular manner to handle operands of any desired length. Any unit can be the left most, right most, or intermediate unit when cascaded.

7 Claims, 14 Drawing Figures

MULTIPLY-DIVIDE UNIT

This invention relates to binary multipliers and dividers.

The implementation of a multiply instruction in the logic system of a computer is complicated and complex. The implementation of a divide instruction is even more so. Small, low cost digital computer systems are usually made without multiply and divide instructions, leaving it to the user to program subroutines to perform these operations. Microprocessors, being very small processors, usually do not include a multiply or divide in their instruction repertoire. The software implementations of multiply and divide instructions, even when made efficiently, require a large amount of memory space to be allocated thereto. The execution of the instructions requires many instruction cycles, i.e., are relatively slow.

To implement fast multiply instructions, peripheral multiplier arrays on separate integrated circuits are used in some systems. An example of such an integrated circuit is the MPY-16 (TRW, Inc.) which multiplies two 16-bit binary numbers to produce a 32-bit result.

Multiplying two digital (binary) numbers can be performed sequentially or combinatorially using cascaded logic networks. The sequential technique is well covered in the literature. (See, for examples, *Digital Computer and Control Engineering,* R. S. Ledley, McGraw-Hill Book Co., Inc., 1960, esp. Chaps. 15 and 16; and *The Logic of Computer Arithmetic,* I. Flores, Prentice-Hall, Inc. 1963, Chaps. 3, 8-11.) The use of combinatorial networks is also well known and, though usually requiring more hardware, produces the result after the propagation delays of the network gates. (See, for examples, "Multiplying Made Easy for Digital Assemblies," by C. Ghest, Electronics, Nov. 22, 1971, pp. 55-61; and "Parallel Multiplier Gets Boost From IC Iterative Logic," by J. Springer and P. Alfke, Electronics, Oct. 12, 1970, pp. 89-93.)

Using a multiplier for division is often accomplished by finding the reciprocal of the divisor and multiplying it by the dividend. The reciprocal of the divisor can be calculated using a software routine based on one of several well-known algorithms. The reciprocal of a binary number can also be calculated by combinatorial logic networks. Both ways are well known in the art. The most straightforward way is the use of combinatorial logic because the result is available after only the network gate propagation delays, and external clocking is not required. For the details of such a network, see, for example, "Designing a Binary Reciprocator," J. R. Logan, *Computer Design,* May, 1973, pp. 109-115.

Peripheral multiplication devices, however, are usually less satisfactory than having built-in multiply and divide instructions. A more useful alternative would be to have a separate array, which can easily accept the operands and perform either multiplication or division.

The present invention accomplishes this by providing storage registers for the operands, and, in response to a control signal that indicates a divide operation is to be accomplished, complements the storage register output of the divisor. Adder circuits are responsive to the least significant stage of the dividend or multiplier operand to control the adding of the aligned portions of the two operands. The control signal not only complements the first operand if the divide instruction is to be performed but also supplies a carry-in signal to the least significant stage of the adder. If a carry-out signal is produced in a divide operation, the least significant stage of the second storage register is set. If the least significant stage of the second operand is set, the adder output values are stored in the second operand register at the next more significant stage during a multiply and at the next less significant stage during a divide; otherwise, the second operand is shifted as described. If the operation to be performed is a divide, a pre-shift to the next higher stage is performed prior to the operation, and a post-shift to the next less significant stage is performed at the completion as a final step of the operation.

Figure 1:
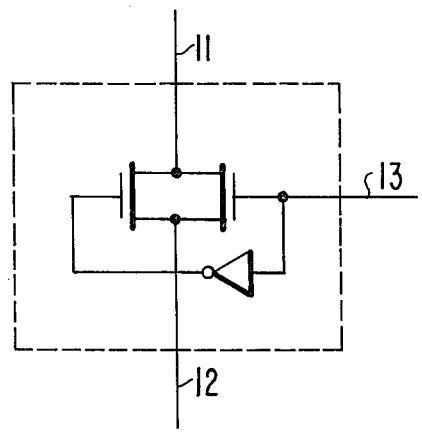
FIG. 1 is a schematic of an FET transmission gate.

FIG. 1 is a schematic showing a typical transmission gate used in the embodiment of the invention. Such transmission gates are well known in the art and operate as bilateral switch elements, i.e., they conduct equally well in both directions when turned on and present a very high impedance or open circuit when turned off. In the various figures of the drawing, a transmission gate is depicted by a small square with three lines, two of which connect at opposite edges, e.g., lines 11 and 12. The line 13 entering at right angles to the other two is a control line. When the control line is a logical one (true), lines 11 and 12 are considered to be connected directly together, permitting signals to flow in either direction. When the control line 13 is a logical zero (false), the transistors are cut off and the lines 11 and 12 are considered to be disconnected from one another.

Figure 2:
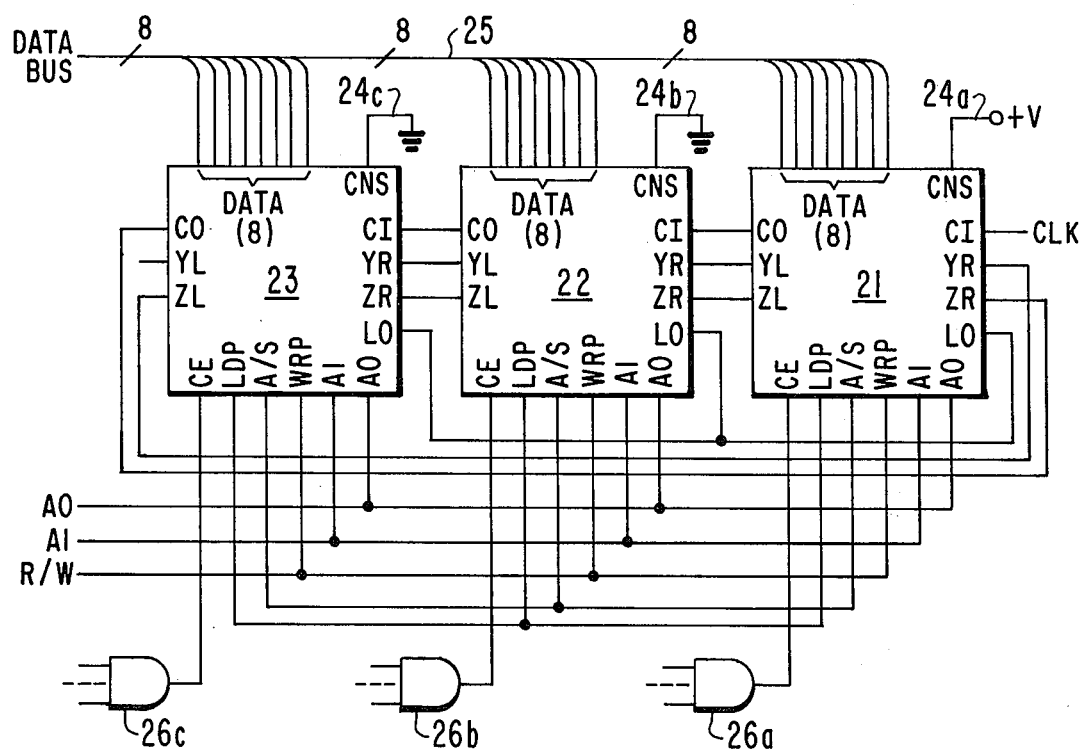
FIG. 2 is a block diagram of cascaded multiply-divide units according to the invention.

The block diagram in FIG. 2 shows units embodying the invention cascaded to handle operands three times longer than those of one unit. A group of three MDU's (multiply-divide units) 21-23 are coupled to a data bus 25 to receive operands and to transmit results.

Each MDU has a CNS terminal, 24a-24c. A logic one input signal (+V in this example) is applied to the CNS terminal 24a of the least significant MDU 21. The CNS terminals 24b and 24c of the remaining MDU's 22 and 23, are coupled to logical zero signals (ground in this example). The CNS signal determines which MDU controls the intercoupled signals as explained in more detail below.

Each MDU receives several signals from a utilization device, typically a processor having an associated memory. Each MDU has a chip-enable input terminal (CE) which is coupled to a separate one of a group of AND gates 26a–26c. Each AND gate 26a–26c responds to a unique combination of high-order address bits from the utilization device. The two least significant address bits, A1 and A0, are coupled to terminals of each MDU in parallel. A read/write control (R/W) signal line is also connected to each unit. In the embodiment being described, it is assumed that when a memory read command is given, the signal on the R/W line represents a logical one. This signal is identified within the MDU's as a negative pulse $\overline{WRP}$, which indicates the signal is a logical zero when a write command is given. The low order address lines (A1 and A0) are used to indicate which operand is being loaded from the data bus 25 into the MDU determined by the high order address bits decoded by one of the AND gates 26a–26c. This is explained in more detail below.

The CI and C0 signals are, respectively, carry-in and carry-out signals to and from internal adders. The YL and YR terminals are bidirectional and are coupled to the left-most stage and the rightmost stage, respectively, of the Y-register. Similarly, the ZL and ZR terminals represent the end stages of the Z-register in each MDU. The interconnecting parallel lines include LDP, A/S, and L0. These are bi-directional lines which carry the signals from the controlling MDU, i.e., the MDU 21 transmits the LDP, A/S, and L0 signals to the other MDU's 22 and 23. The purposes of these signals will be clear from the detailed operation described below. The registers and adder terminals are connected ad seriatim with the final (most significant) MDU's C0 terminal coupled to the initial (least significant) MDU's ZR terminal. The final MDU's ZL terminal is coupled to the initial MDU's YR terminal. This coupling arrangement is used for any number of units and each unit can be the initial, final, or intermediate MDU. If only one MDU is used, the feedback connections from C0 to ZR and from YR to ZL are the same except that they are on the same MDU.

Figure 3:
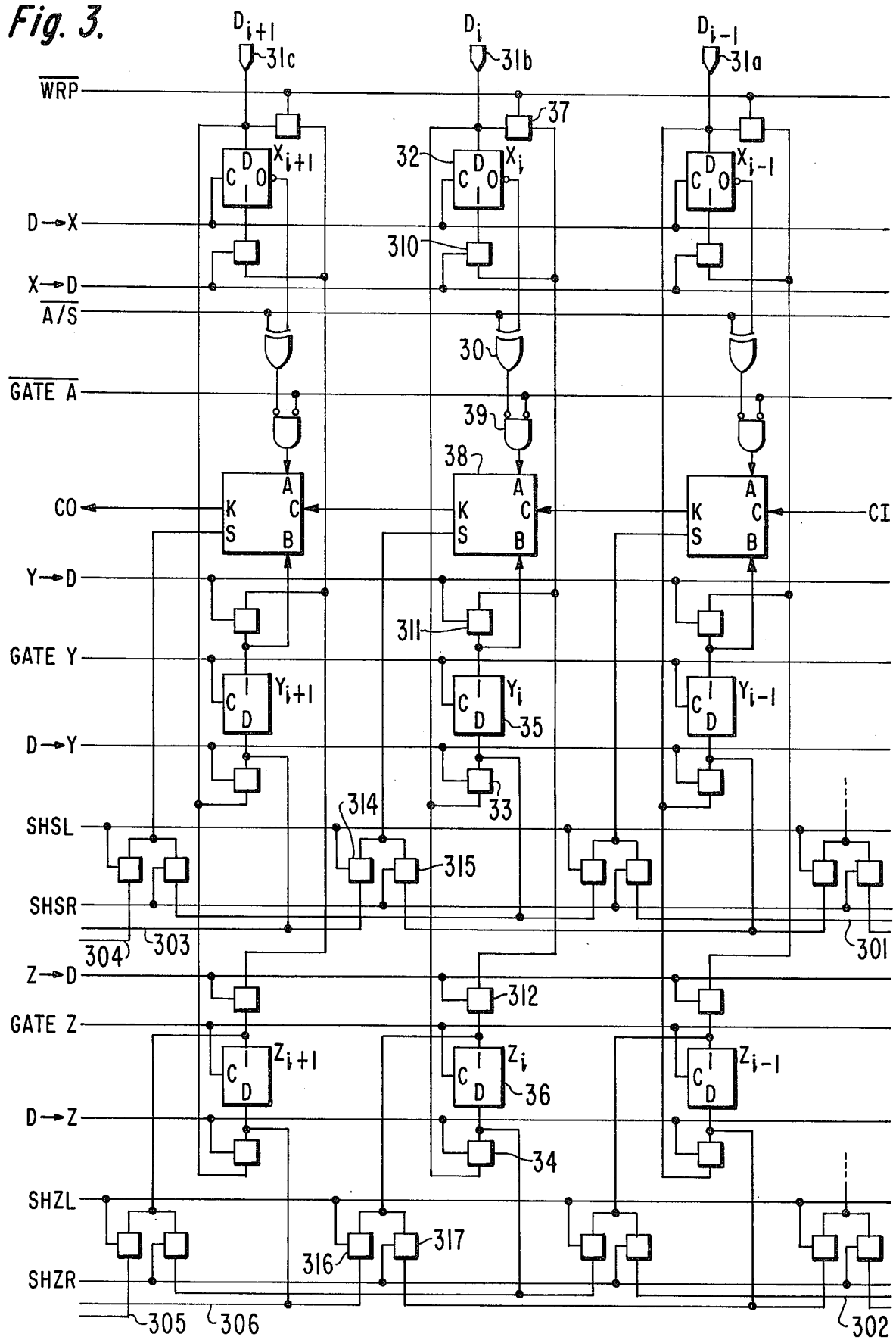
FIG. 3 is a block diagram of a typical column of the adder-register array, with a preceding and following column, used in the system of the invention.

FIG. 3 is a block diagram of three typical bit columns of the register array in an MDU. The i-th stage is considered typical of the stages and of the MDU array; the initial and final stages of the array are described separately below. The data bus terminals 31a–31c receive the signals representing the operands from the data bus 25 (FIG. 2) and couple the results from the proper registers to the data bus for use by the associated utilization device. The typical data terminal 31b is coupled directly to the D-input terminal of a D-type flip-flop 32, the i-th stage of the MDU's X-register. The operation of D-type flip-flops is described in detail in U.S. Pat. No. 3,588,545. The typical data terminal 31b is also coupled to typical transmission gates 33 and 34 through which it can be selectively coupled to the D-input terminal of a flip-flop 35, representing the i-th stage of the Y-register, or to the D-input terminal of a flip-flop 36, representing the i-th stage of the Z-register. The X-register stages are clocked by a D to X signal, the Y-register stages, by a Gate Y signal, and the Z-register stages, by a Gate Z signal. These signals load operands into the selected register from the data bus.

Through another transmission gate 37, the typical data bus terminal 31b can be coupled to three other transmission gates 310-312, through which the set output signals from the X-, Y-, or Z-registers, respectively, can be selectively coupled to the data bus. The transmission gate 37 is controlled by the $\overline{WRP}$ signal. The transmission gate 310 is controlled by an X to D (where the arrow in the figures is interpreted as 'to') signal, the transmission gate 311 is controlled by a Y to D signal, and the transmission gate 312 is controlled by a Z to D signal. These signals couple the results to the data bus.

Each column in the MDU's register array includes an adder, typically an i-th stage adder 38. The operands are coupled to the A and B terminals, the C signal being the carryin signal from the next less significant stage. A sum signal is produced at the S terminal and a carry-out signal, on the K terminal. The B operand is taken directly from the set output terminal of the $Y_i$ stage 35. The A operand is taken from the output of a NOR (negative input AND) gate 39 which is controlled by a $\overline{\text{Gate A}}$ signal. The other input signal to the NOR gate 39 is the output signal from an XOR (Exclusive OR) gate 30 which is used as a controllable inverter. One input terminal of the XOR gate 30 is coupled directly to the reset output terminal of the $X_i$ stage 32 and the other, to an $\overline{A/S}$ signal. When the $\overline{A/S}$ signal is a logical zero, the value stored in the $X_i$ stage 32 appears at the output terminal of the NOR gate 39 because the complemented value from the reset output terminal is recomplemented through the NOR gate 39. If the $\overline{A/S}$ signal is a logical one, the complement of the value in the $X_i$ stage 32 is applied to the A operand terminal of the adder 38 because a third inversion takes place in the XOR gate 30.

The carry-out signal from the adder 38 is coupled to the carry-in terminal of the next more significant $(i+1)$-th, stage adder. The sum output signal from the adder 38 is coupled to two transmission gates 314 and 315.

A shift sum left signal (SHSL) enables the transmission gate 314, coupling the sum output signal from the i-th stage adder 38 to the D-input terminal of the next more significant $Y_{i+1}$ stage. A shift sum right (SHSR) signal enables the transmission gate 315, coupling the sum output signal from the i-th stage adder 38 to the D-input terminal of the next less significant stage $Y_{i-1}$. A gate Y signal applied to the clock input of all of the Y stages when either a SHSL or SHSR signal is a logical one stores the sum of the values from the X-register and Y-register in the next more significant or next less significant stage of the Y-register, respectively. If the $\overline{\text{Gate A}}$ signal is a logical one, the sum value from the adder is the value from the Y-register so that the contents of the Y-register are shifted one stage left or right in response to the SHSL or SHSR signals, respectively.

The Z-register is arranged to permit selectively shifting its contents one stage to the right or to the left. Typically, the set output signal from the $Z_i$ stage 36 is coupled to two transmission gates 316 and 317. A Shift Z Left (SHZL) signal enables the transmission gate 316 which couples the $Z_i$ stages' set output signal to the D-input terminal of the $Z_{i+1}$ stage. A Shift Z Right (SHZR) signal enables the transmission gate 317 which couples the set output signal from the $Z_i$ stage 36 to the D-input terminal of the $Z_{i-1}$ stage. A Gate Z signal then causes the contents of the Z-register to shift left or to shift right by one stage according to whether the SHZL or SHZR signal is concurrently activated, respectively.

Figure 4:
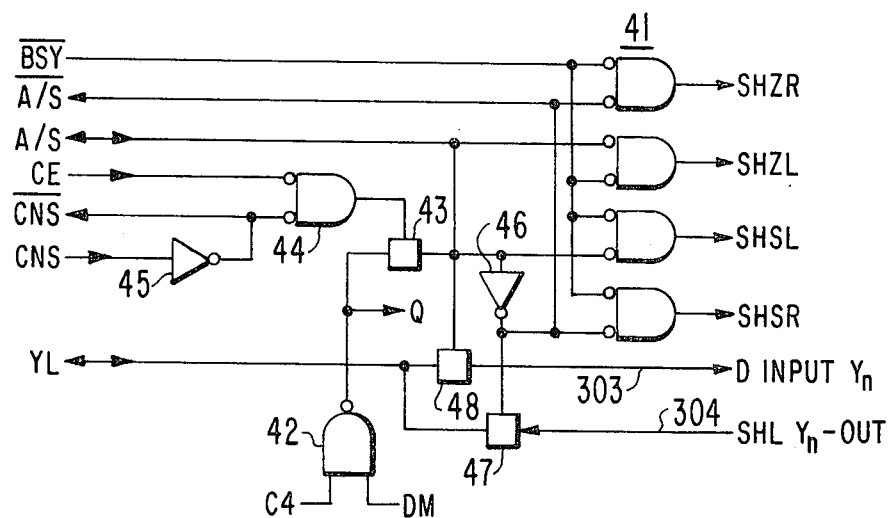
FIG. 4 is a logic diagram of a portion of the control logic of a unit.

The sources of the controlling signals in the circuit of FIG. 3 are shown in FIGS. 4, 5, 7, and 8. In FIG. 4, the signals controlling the direction of shifting the sum (or Y-register) and the Z-register are the output signals from a group of NOR gates 41. The registers are shifted to the right when a busy (BSY) signal is a logical one ($\overline{BSY}$ a logical zero) and the A/S signal is a logical zero. The registers are shifted to the left when the A/S signal has a value of logical one.

The A/S signal is derived from the set output signal from a DM flip-flop and a C4 timing signal, both described below, via a NAND gate 42 to produce a logical zero signal coupled to a transmission gate 43, which is controlled by the output signal from a NOR gate 44. The NOR gate 44 is enabled by the CNS signal having a value of logical one, which is inverted to a logical zero by an inverter 45, when the CE (chip-enable) signal is a logical zero. During the initialization (loading) phase of the operation, the NOR gate 44 is disabled. The CNS signal, as described above, indicates that the MDU is the controlling unit. The other terminal of the transmission gate 43 supplies the A/S signal when the CNS signal is a logical one or receives the A/S signal from another unit when the CNS signal is a logical zero. When the controlling unit 21 in FIG. 2 supplies the A/S signal, it is coupled to the other two units 22 and 23 in which the respective transmission gate 43 is disabled. Therefore, the A/S terminal is an output signal in the controlling unit 21 and a receiving terminal in the other units 22 and 23. The A/S signal is inverted by an inverter 46 to produce the $\overline{A/S}$ signal, which controls inter alia a transmission gate 47 that couples the most significant stage of the Y-register, i.e., the $Y_n$ stage, to the YL terminal of the associated unit. In FIG. 3, if it is assumed that the $Y_{i+1}$ stage is the $Y_n$ stage, then the line representing the sum output signal from the n-th stage adder, when shifted left, is coupled to a line 304. In FIG. 4, the line 304 is coupled to the transmission gate 47. Thus, when the $\overline{A/S}$ signal is a logical one, the YL terminal of the associated unit is an output terminal for shifting the sum signal from the most significant adder stage of the associated MDU to the least significant stage of the next more significant MDU. Alternatively, when the A/S signal is a logical one, a transmission gate 48 is enabled and couples the YL terminal to the D-input terminal of the $Y_n$ stage via a line 303 shown in FIGS. 3 and 4. In the alternative case, the YL terminal of the associated unit is a receiving terminal which receives signal to be shifted into most significant stage of the Y-register of the associated MDU.

Figure 5:
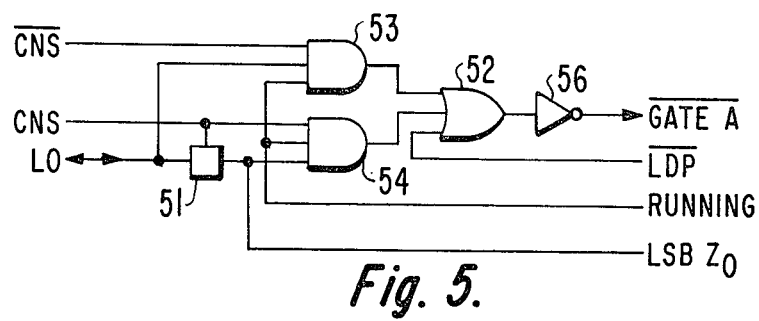
FIG. 5 is a logic diagram of the adder control of a unit.

FIG. 5 shows a circuit for the generation of the $\overline{Gate\ A}$ signal which couples the X-register to the adder. A transmission gate 51 is controlled by the CNS signal to produce an output signal to the LO terminal of the associated MDU if the least significant stage of the Z-register, the $Z_0$ stage, stores a logical one. If the transmission gate 51 is not enabled, then the LO terminal of the associated MDU is a receiving terminal so that the LO line carries the value of the least significant stage of the Z-register no matter how many MDU's are cascaded. Two three-input AND gates 53 and 54 receive a RUNNING signal which indicates that the unit is operating. The AND gate 53 receives the $\overline{CNS}$ signal and the AND gate 54, the CNS signal. The least significant bit signal from the Z-register is coupled to the AND gate 54 and the LO signal is coupled to the AND gate 53. Therefore, in the controlling MDU, the AND gate 54 is activated by the least significant stage of the Z-register and in the other units, the gate 53 is activated by the same condition via the LO terminals. An OR gate 52 and an inverter 56 couple the Gate A signal to the NOR gate 39 shown in FIG. 3. The OR gate 52 is also activated by an $\overline{LDP}$ signal for reasons explained below.

Figure 7:
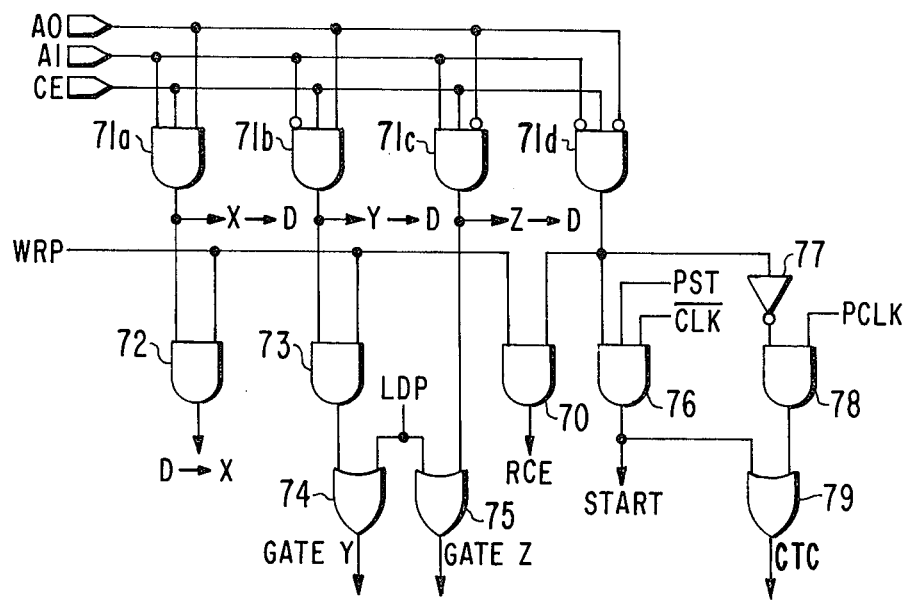
FIG. 7 is a logic diagram of the register controls in a unit.

In FIG. 7, a group of AND gates 71a–71d decode the least significant bits of the address, A0 and A1, and produce a corresponding output signal from one of the gates when the CE signal is present. The AND gate 71a is activated when both address bits A0 and A1 have a value of a logical one to supply the X to D signal. If it occurs concurrently with a WRP signal, a D to X signal is produced by an AND gate 72. In a similar way, the output signal from the gate 71b produces the Y to D command signal when the A1 address bit is a logical zero and the A0 address bit is a logical one. Again, when coincident with a WRP signal, the Gate Y signal is produced by the AND gate 73 via an OR gate 74. The Z to D signal is produced by the AND gate 71c when the A1 address bit is a logical one and the A0 address bit is a logical zero. The output signal from the AND gate 71c produces the Gate Z command signal via an OR gate 75. Another input signal to the OR gates 74 and 75 is the LDP signal which generates both Gate Y and Gate Z command signals. When both address bits have a logical value of zero, the AND gate 71d is activated which primes two AND gates 76 and 70. The output signal from the AND gate 76 is a START signal which is produced when a pre-start (PST) flip-flop is set and when the clock pulse has a logical zero value. When the AND gate 71d is disabled, its output signal is inverted by an inverter 77 to prime an AND gate 78. The AND gate 78 is enabled by the positive clock pulses (PCLK) which are derived from a gated clock source. The output signals from the AND gate 78 activate an OR gate 79 which produces an CTC signal. When a WRP signal occurs concurrently with the output signal from the AND gate 71d, the AND gate 70 produces a reset signal to a clock-enable (CLKEN) flip-flop.

Figure 8:
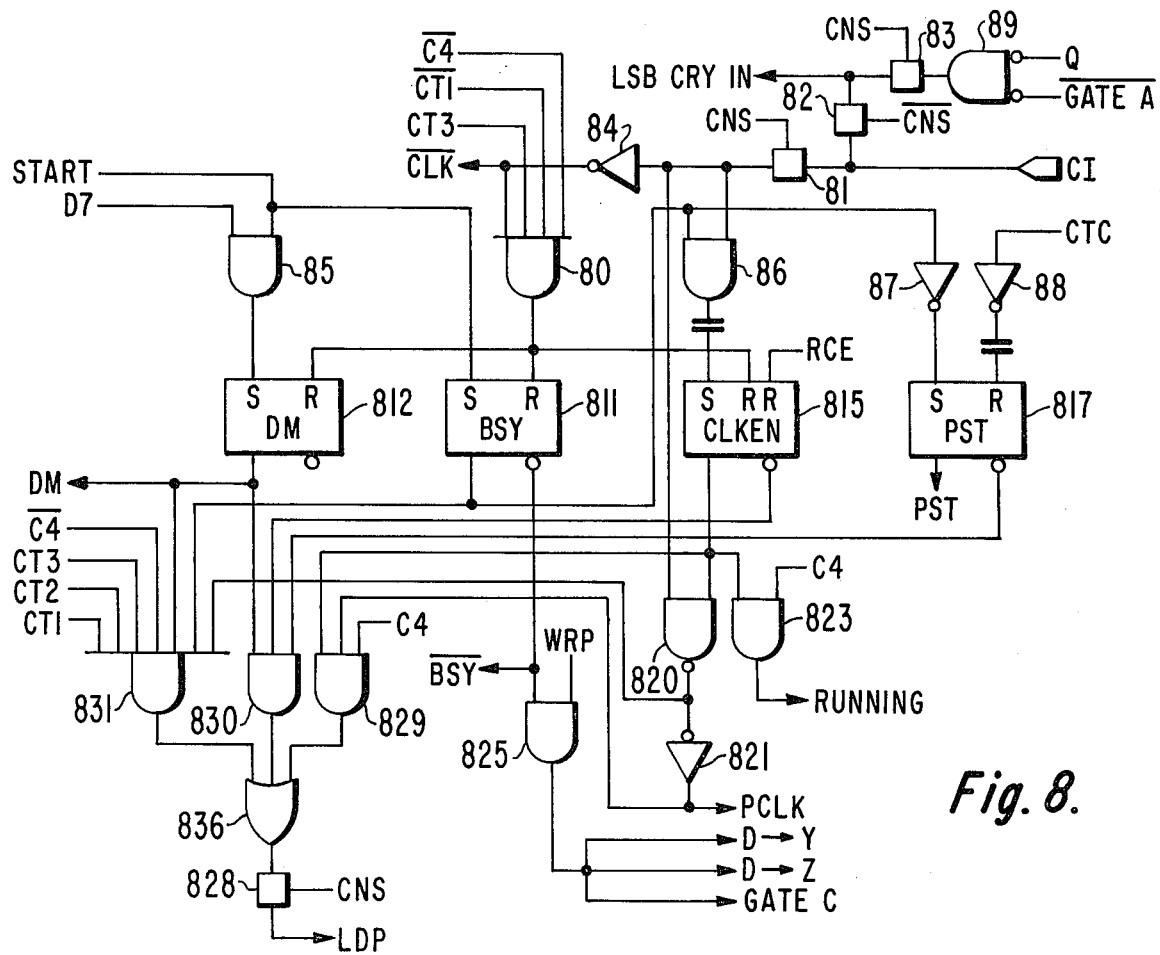
FIG. 8 is a logic diagram of the timing controls in a unit.

In FIG. 8, the CI terminal is coupled to two transmission gates 81 and 82. In the controlling unit, the transmission gate 81 is activated and in the other units, the transmission gate 82 is activated. In the latter case, the CI terminal is coupled to the carry-in terminal of the adder of the least significant bit. In the former case, the CI input signal is a clock signal that controls all the units. The clock signal is passed in the controlling unit by the transmission gate 81 and is inverted by an inverter 84 to provide negative polarity clock pulses. The START output signal from the AND gate 76 (FIG. 7) sets the BSY flip-flop 811 and primes an AND gate 85. The AND gate 85 is enabled by a data line from the data bus, in this case, the $2^7$ bit of the data bus. This bit is a logical one if a divide operation is to be performed. Consequently, the A/S signal is a logical one for a multiply operation and its complement $\overline{A/S}$, is a logical one for a divide operation (see FIG. 4). A clock signal occurring after the BSY flip-flop 811 has been set enables an AND gate 86 which attempts to set the clock-enable (CLKEN) flip-flop 815. (A capacitor symbol is used at the set terminal of the flip-flop 815 to indicate that the positive-going edge of the input signal sets the flip-flop.) Setting the BSY flip-flop 811 removes a logical zero from an inverter 87 whose resulting logical one output signal was maintaining a PST flip-flop 817 in the set condition. The CTC output signal from the OR gate 79 (FIG. 7) resets the flip-flop 817 via an inverter 88 on the negative-going edge of the CTC signal (positive-going signal from the inverter 88). The output signal from the AND gate 70 (FIG. 7) maintains the CLKEN flip-flop 815 in the reset condition while the CE signal is present.

Therefore, the CLKEN flip-flop 815 is not set until the CE signal is removed from the MDU.

Figure 12:
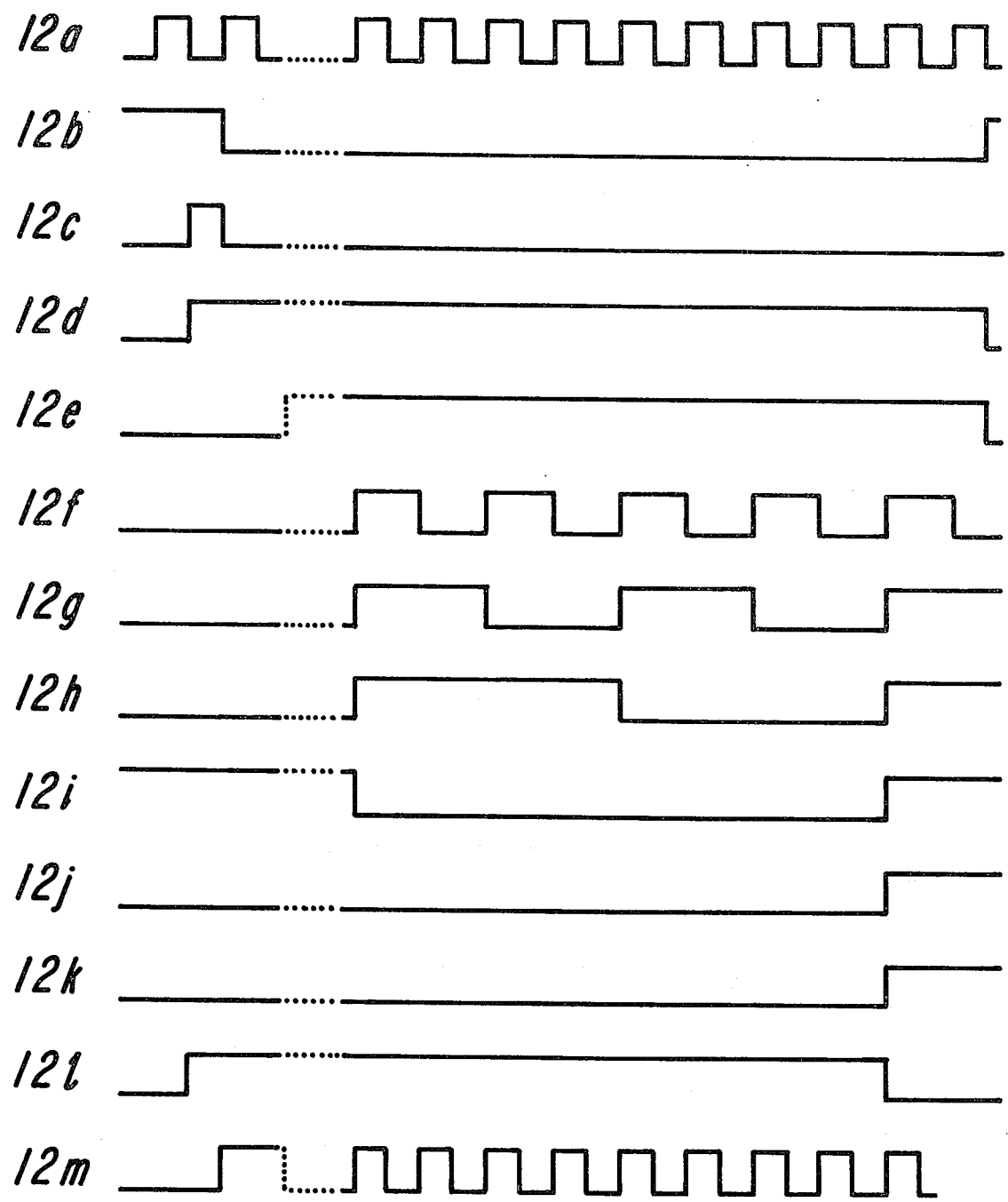
FIG. 12 is a timing diagram showing the relation among control signals during a divide operation.

The clock signal that occurs after the removal of the CE signal sets the CLKEN flip-flop 815 via the AND gate 86. Representative timing signals of the flip-flops are shown in FIG. 12. FIG. 12(a) shows the clock signal; FIG. 12(b) shows the set output signal from the PST flip-flop 817; FIG. 12(c) shows the start output signal from the AND gate 76 (FIG. 7); and FIG. 12(d) is the set output signal from the BSY flip-flop 811. (If a divide is to be performed, the DM flip-flop is the same as the BSY flip-flop.) FIG. 12(e) is the set output signal from the CLKEN flip-flop 815. After the CLKEN flip-flop 815 is set, a NAND gate 820 is enabled by each clock signal thereafter. Its output signals are inverted by an inverter 821 to produce the PCLK signals which are coincident with the clock signals shown in FIG. 12(a). The RUNNING signal is supplied by an AND gate 823 when both the CLKEN flip-flop 815 and the C4 flip-flop (FIG. 6) are set. An AND gate 825 is activated by the BSY flip-flop 811 reset and a WRP signal to produce the D to Y, the D to Z, and the Gate C signals.

The LDP signal is supplied from a transmission gate 828 by the CNS signal of the controlling MDU. The LDP terminals in the remaining MDU's receive the LDP signal from the transmission gate 828. The LDP signals are generated in the controlling MDU by an AND gate 829 through an OR gate 836. The AND gate 829 is driven by the PCLK signal from the inverter 821 when the CLKEN flip-flop 815 and the C4 timing flip-flop are set. Pre-shift and post-shift signals are supplied by AND gates 830 and 831, respectively. The purpose of the pre-shift and post-shift signals during a divide operation is explained in more detail below.

Figure 6:
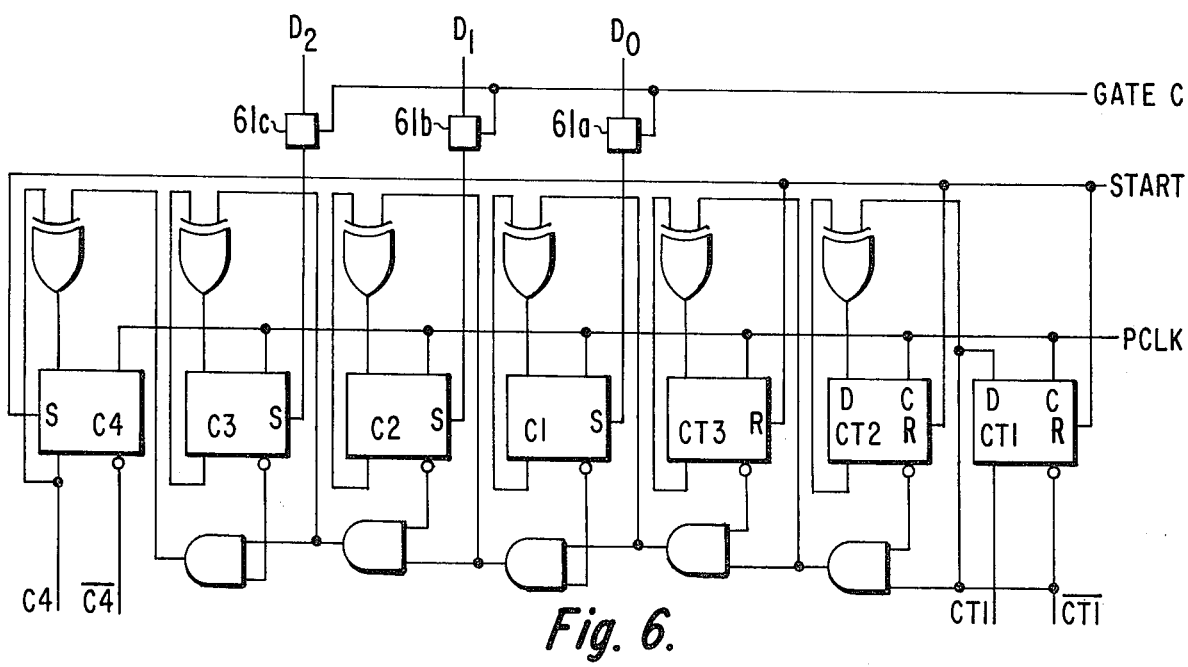
FIG. 6 is a logic diagram of a timing counter useful in the system of the invention.

FIG. 6 shows a timing counter. The counter stages operate as a synchronous binary decrementing counter. The lower order stages CT1-CT3, count the time pulses for an eight-bit MDU. The number of units cascaded is initially set into stages C1-C3 in binary form to indicate the number of eightbit pulse groups that are to be generated. The C1-C3 stages are set by data bus lines via the Gate C control signal from the AND gate 825 (FIG. 8). The counter stages are driven by the PCLK clock signal. The START signal initially resets the stages CT1-CT3 and sets the stage C4. The C1-C3 stages are set as described above. If only one unit is used, then the C1 stage only is set and the C2 and C3 stages are reset. Up to eight units can be cascaded with the counter shown. FIGS. 12(f) – 12(l) show the output signals from stages CT1 thorugh C4, respectively.

Figure 9:
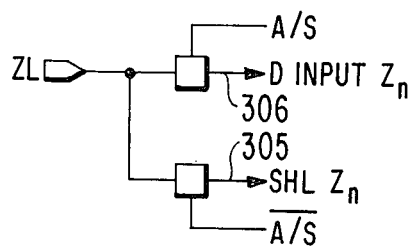
FIG. 9 is a block diagram of the leftmost Z-register stage termination.

FIG. 9 shows the connections from the ZL terminal to the leftmost stage of the Z-register. The ZL terminal is coupled to the D-input of the most significant Z stage when the A/S signal is a logical one by a line 306 in FIGS. 9 and 3; in the latter figure, the $Z_{i+1}$ stage is considered to be the leftmost (most significant) stage. When the A/S signal is a logical zero, the ZL terminal is an output terminal transmitting the output signal from line 305 shown in FIG. 3.

Figure 10:
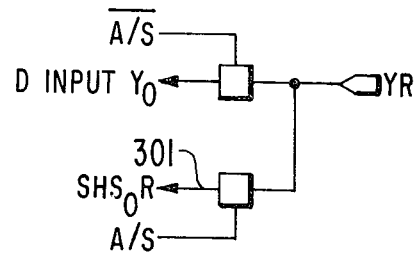
FIG. 10 is a block diagram of the right most Y-register stage termination.

FIG. 10 shows a similar connection for the YR terminal. When the A/S signal is a logical one, the YR terminal is an output terminal coupled to line 301 in FIG. 3 which transmits the value of the least significant bit of the sum from the adder when shifted to the right. If the value of A/S is a logical zero, then the YR terminal is a receiving terminal and is coupled to the D-input terminal of the $Y_o$ register.

Figure 11:
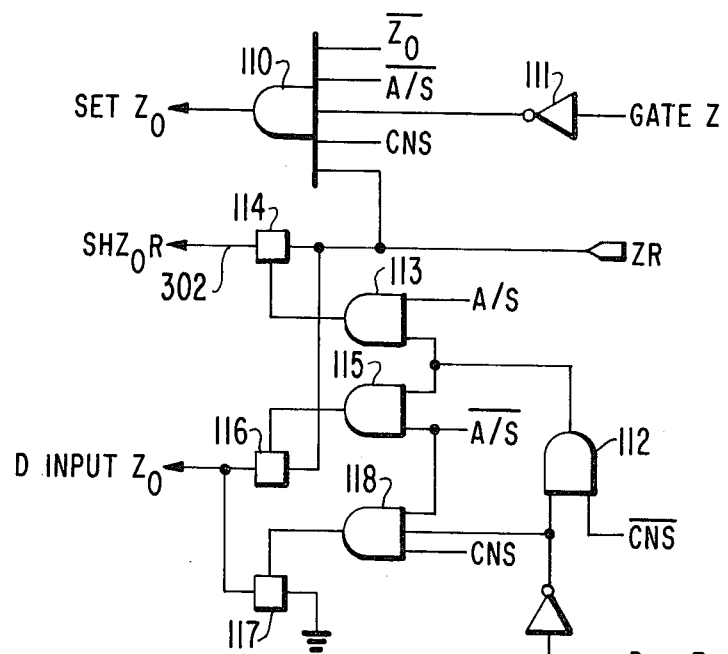
FIG. 11 is a logic diagram of the rightmost Z-register stage termination.

FIG. 11 shows the connections to the rightmost (least significant) stage of the Z-register and to the ZR terminal. The $Z_O$ stage in the controlling unit is set directly by a logical one at the ZR terminal if the A/S signal is a logical zero (divide operation) and if the stage is not already set. The Set $Z_O$ signal is the output signal from an AND gate 110, which is inhibited during the loading and shifting operations by the inversion of the Gate Z command signal by an inverter 111. The $Z_O$ stage must have a direct set input terminal.

In the noncontrolling units, an AND gate 112 is enabled by the $\overline{CNS}$ signal during the time that the D to Z signal is a logical zero, i.e., not during the loading of the Z-register. If the A/S signal is a logical one, an AND gate 113 controls a transmission gate 114 to couple line 302 (FIG. 3) to the ZR terminal. If the A/S signal is a logical zero, an AND gate 115 controls the transmission gate 116 to couple the ZR terminal to the D-input terminal of the $Z_O$ stage. The D-input terminal of the $Z_O$ stage is also coupled to a second transmission gate 117 which is activated by the output signal from an AND gate 118 in the controlling unit by the $\overline{A/S}$ signal to insure that a zero value is shifted into the least significant stage during a divide operation.

In the operational description which follows, it is assumed that only one MDU is being used, and that it has a capacity of eight bits. There are some values of dividend and divisors that will produce incorrect results, i.e., division by zero or division using operands that produce a quotient exceeding the capacity of the Z-register. If no validity checks, such as zero divisor or a divisor less than the most significant n digits of a 2n digit dividend, are performed, a resulting CO signal can be sensed by the utilization device through external flags, interrupts, or similar facilities. A logical one on the CO line at the end of a divide operation indicates that an error occurred.

The MDU is enabled by a CE signal when the utilization device generates a particular address, a WRP signal, and an operand on the data bus. Initially, the A1 and A0 address bits are a logical one. This causes the multiplicand in a multiply operation or a divisor in a divide operation to be loaded into the X-register by the following sequence of signals. The D to X command signal is generated by the AND gate 72 (FIG. 7) and clocks the X-register stages so that the operand from the data bus, which is coupled directly to the D-input terminals, is set into the X-register (See FIG. 3).

If a divide operation is to be performed, the dividend value is loaded into the Z-register or into both the Y- and Z-registers. A double-length operand can be loaded so that the least significant bits (eight bits in the illustrative system) are loaded into the Z-register. The most significant stage of the Y-register is not set during loading because all operands are assumed to be positive two's-complement values. Prior to a multiply operation, the multiplier is loaded into the Z-register.

The Y- and Z-registers are loaded in the same way as the X-register. The D to Z and D to Y signals from the AND gate 825 (FIG. 8) couple the data bus lines to the D-input terminals of the registers. The Gate Y and Gate Z command signals are supplied by the OR gates 74 and 75 (FIG. 7) as explained above.

To begin the operations, the associated processor issues a WRP signal and an enabling address with the A1 and A0 address bits equal to zero. The values to be set into the C1-C3 registers of the timing chain as shown in FIG. 6 are put on the least significant data bus lines and, if the operation is a divide operation, a logical one is put on the most significant data bus. The AND gate 71(d) (FIG. 7) produces an output signal which together with a WRP signal activates the AND gate 70 to hold the CLKEN flip-flop 815 (FIG. 8) reset. The output signal from the AND gate 825 supplies the Gate C signal that activates the transmission gates 61a-61c to set the C1-C3 stages of the timing counter to the values on the three least significant data bus lines. A negative-going clock signal enables the AND gate 76 (FIG. 7) which generates the START signal which sets the BSY flip-flop 811 and the DM flip-flop 812 in a divide operation (FIG. 8).

The next negative-going clock signal produces another START signal from the AND gate 76 which, via the OR gate 79 (FIG. 7), is applied to the inverter 88 (FIG. 8) which resets the PST flip-flop 817. Setting the BSY flip-flop 811 inhibits further generation of the command signals D to Y, D to Z, and Gate C. When the WRP or the CE signal is removed, the AND gate 70 (FIG. 7) is inactivated, permitting the next clock pulse to set the CLKEN flip-flop 815 (FIG. 8) via the AND gate 86. This enables the NAND gate 820 which produces the PCLK signals from the inverter 821. The above-described sequences of signals load the operands and start the operation.

Figure 13:
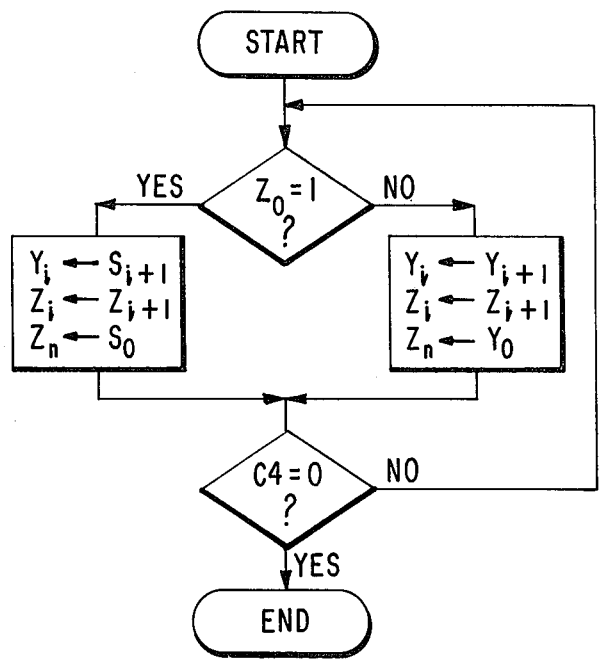
FIG. 13 is a flowchart showing the sequence of operations to perform a multiply operation.

The multiply operation will be explained first. A flow chart of the operation sequence is shown in FIG. 13. The value of the least significant Z-register stage, $Z_O$, determines whether the value in the X-register is to be gated to the adder. The add and shift operations are performed together to increase the speed of operation.

If $Z_O$ is a zero, the concatenated Y- and Z- registers are shifted one stage to the right. The $Y_{i+1}$ stage is shifted to the $Y_i$ stage by generation of the SHSR signal from the NOR gate (FIG. 4) because both the $\overline{BSY}$ and $\overline{A/S}$ signals are logical zeroes. The $Z_{i+1}$ to $Z_i$ shift is similarly accomplished by the SHZR signal. These signals activate the proper transmission gates such as the transmission gates 315 and 317 to couple the values of each stage to the D-input terminal of the next stage to the right for storage in response to the Gate Y and Gate Z signals from the OR gates 74 and 75 activated by the LDP signal from the AND gate 829 via the OR gate 836 and the transmission gate 828. Since the $\overline{Gate\ A}$ signal is not activated via the AND gate 54 (FIG. 5) because LSB $Z_O$ is a logical zero, the sum output signals from the adders (FIG. 3) are the values in the associated Y-register stages.

If $Z_O$ is a one, the same sequence described in the preceding paragraph occurs except that the value in the X-register is gated to the adders by the $\overline{Gate\ A}$ signal and is added to the value in the Y-register. The sum is stored in the next lower Y-register stage.

The $Y_O$ value is gated into the $Z_n$ stage via the YR and ZL terminals and the transmission gate (FIG. 9) coupling the ZL terminal to the line 306 when the A/S signal is a logical one.

When eight shifts have been completed, the C4 register is reset, which inhibits the LDP signals from the AND gate 829 (FIG. 8) and the RUNNING signal from the AND gate 823. The AND gates 830 and 831 are inhibited by the reset condition of the DM flip-flop 812 during a multiply operation. The absence of the RUNNING signal inhibits the AND gate 54 (FIG. 5) from supplying further $\overline{Gate\ A}$ signals. When CT1 is decremented to zero by the PCLK signal following that which reset the C4 flip-flop, the output signal from an AND gate 80 resets the DM flip-flop 812, the BSY flip-flop 811, and the CLKEN flip-flop 815. Resetting the BSY flip-flop 811 forces the PST flip-flop 817 to the set condition. This terminates the operation with the double-length product in the Y-register and Z-register.

The more significant part of the product can be read out by the processor by supplying an address that will activate the AND gate 71b as described above. The absence of the WRP signal activates the transmission gate 37 and couples the Y-register value to the data bus via the transmission gate 311 activated by the output signal Y to D from the AND gate 71b. Similarly, the least significant part of the product in the Z-register is read out by activating the AND gate 71c (FIG. 7).

The following is an example of the values in the registers for multiplying 5 × 13 = 65. Initially, the X-register is loaded with a binary value of 5 (00000101) and the Z-register with 13 (00001101).

The Y- and Z-registers are shown in line because, in effect, they form a single register due to the external connections. As loaded, the register contents are shown as follows:

X = 00000101

Y, Z = 00000000 00001101

(Even though "Y,Z" is the symbolic way of writing "Y is concatenated with Z", the actual values in each are separated by spaces for purposes of illustration.) The add-shift steps are performed concurrently. For example, the $Z_O$ stage is set initially so step 1 includes adding the X-value to the Y-value. The initial value of Y is zero so Step 1 results in the X value shifted into the next less significant stages of the concatenated Y, Z registers. The contents of Z are also shifted, placing the zero value in $Z_O$. Therefore, Step 2 is merely a shift of the contents of the Y, Z, registers to the right. The remaining steps proceed according to the same rules.

| | | | |
|---|---|---|---|
| X = | 00000101 | | |
| Y,Z = | 00000010 | 10000110 | STEP 1 |
| X = | 00000101 | | |
| Y,Z = | 00000001 | 01000011 | 2 |
| X = | 00000101 | | |
| Y,Z = | 00000011 | 00100001 | 3 |
| X = | 00000101 | | |
| Y,Z = | 00000100 | 00010000 | 4 |
| X = | 00000101 | | |
| Y,Z = | 00000010 | 00001000 | 5 |
| X = | 00000101 | | |
| Y,Z = | 00000001 | 00000100 | 6 |
| X = | 00000101 | | |
| Y,Z = | 00000000 | 10000010 | 7 |
| X = | 00000101 | | |
| Y,Z = | 00000000 | 01000001 | 8 |

The product of sixty-five (01000001) is stored in the Z-register at the end of the multiply operation.

Figure 14:
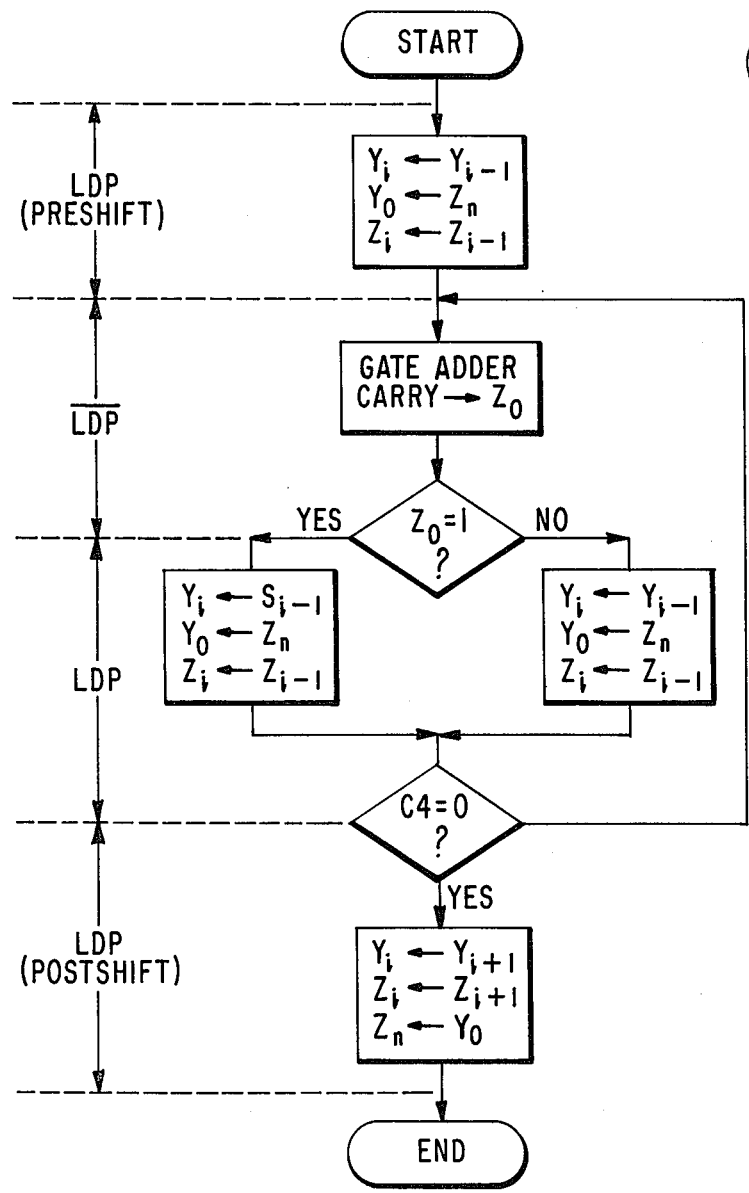
FIG. 14 is a flowchart showing the sequence of operations to perform a divide operation.

The divide operation sequence is charted in FIG. 14. The sequence of operation requires a shift left followed by a subtract. To use the add-shift logic to perform a shift-substract step, a pre-shift to the left is made as a preliminary step. The steps of subtract-shift are then completed for all bits, followed by a post-shift to the right to restore the operands to their proper position. The left shift direction is controlled by the A/S logical zero signal produced by the NAND gate 42 (FIG. 4) when the DM flip-flop is set.

The pre-shift is produced by the LDP signal generated by the AND gate 830 (FIG. 8) while the CLKEN flip-flop 815 is reset while the PST flip-flop 817 is also reset. In FIG. 12(m), the pre-shift LDP pulse is the first pulse shown.

The subtract-shift sequence of the divide operation is the same as the add-shift sequence of the multiply operation. The subtraction of the divisor in the X-register from the dividend in the Y-register is accomplished by complementing the divisor into the adder via the XOR gates 30 (FIG. 3) and supplying an initial low order carry-in via a NOR gate 89 (FIG. 8) and the transmission gate 83. The XOR gates are activated by the $\overline{A/S}$ signal, which is a logical one during a divide operation. The NOR gate 89 (FIG. 8) is responsive to the output signals from the NAND gate 42 (FIG. 4) and from the inverter 56 (FIG. 5). This adds the 1's complement of the X-register to the Y-register, which, by providing an initial carry-in, becomes the equivalent of adding the 2's complement of the X-register to the Y-register.

The flow chart of FIG. 14 is helpful in following the sequence of the divide operation. After the pre-shift, which occurs during a PCLK time (LDP), the complement of the X-register is applied to the adder and the carry-out from the most significant adder stage is set into the least significant stage, $Z_O$, of the Z-register during the time interval between LDP signals, i.e., during the $\overline{LDP}$. The Gate A signal is produced via the OR gate 52 and the inverter 56 (FIG. 5) during a $\overline{LDP}$ interval. The value of the most significant carry is produced at the CO terminal which is connected to the ZR terminal. The $Z_O$ stage is set to the CO value via the AND gate 110 (FIG. 11). This is accomplished during $\overline{LDP}$ by inverting the output signal from the OR gate 75 (FIG. 7) which is a logical zero during $\overline{LDP}$, to a logical one by the inverter 111 (FIG. 11).

During the next LDP interval the Z-register is shifted to the left and the Y-register either shifts its contents to the left if the value in $Z_O$ is a zero or the adder output is stored one stage to the left in the Y-register if the value in $Z_O$ is one. The Y— and Z—registers are concatenated so that the contents of the most significant Z-register stage are shifted into the least significant Y-register stage. A zero is shifted into the $Z_O$ stage via the transmission gate 117 (FIG. 11) which is activated by the output signal from the AND gate 118.

The sequence of operations continues until the C4 flip-flop is reset, at which time the NAND gate 42 (FIG. 4) is disabled so that the A/S signal becomes a logical one. The AND gate 831 (FIG. 8) is enabled by $\overline{C4}$ to produce a post-shift LDP signal. The change in the A/S signal causes the post-shift to be to the right. This post-shift LDP pulse is the last pulse shown in FIG. 12(m).

At the next negative clock pulse, the AND gate 80 is activated signifying the completion of the operation. The quotient is in the Z-register and the remainder is in the Y-register. The values can be read out as described above for a multiply operation.

As an example of a divide operation, the following illustrates in the same way as the multiply example, the contents of the various registers when 85 (01010101) is divided by 6 (00000110);

```
Carry-In =        1
       X = 11111001    (1's complement of 6)
     Y,Z = 00000000    01010101    Load
Carry-Out = 0
      CI =        1
       X = 11111001
     Y,Z = 00000000    10101010    Pre-shift left
      CO = 0
```

-continued

```
      CI =        1
       X = 11111001
     Y,Z = 00000001    01010100    Step 1
      CO = 0
      CI =        1
       X = 11111001
     Y,Z = 00000010    10101000    Step 2
      CO = 0
      CI =        1
       X = 11111001
     Y,Z = 00000101    01010000    Step 3
      CO = 0
      CI =        1
       X = 11111001
     Y,Z = 00001010    10100001    Step 4
      CO = 1
      CI =        1
       X = 11111001
     Y,Z =           00001001 01000011    Step 5
      CO =        1
      CI =        1
       X = 11111001
     Y,Z = 0000110     10000111    Step 6
      CO = 1
      CI =        1
       X = 11111001
     Y,Z = 00000001    00001110    Step 7
      CO = 0
      CI =        1
       X = 11111001
     Y,Z = 00000010    00011100    Step 8
      CO = 0
      CI =        1
       X = 11111001
     Y,Z = 00000001    00001110    Post-shift right
      CO = 0
```

The quotient 14 is in the Z-register and the remainder 1 is in the Y-register at the completion of the final step, the post-shift right.

The above description discloses a multiply-divide unit wherein the same circuits used for the multiply operation are used for the divide operation. The divide operation, which is usually performed as a shift left-subtract operation, is changed to a subtract (add complement) — shift left operation to utilize the multiply hardware. Circuits for convenient partitioning have also been described so that many such units can be cascaded to handle long operands.

Various modifications to the systems and circuits described and illustrated to explain the concepts and modes of practicing the invention can be made by those of ordinary skill in the art within the principles or scope of the invention as expressed in the appended claims.

What is claimed is:

1. A circuit for multiplying or dividing a multiplicand or divisor value stored in a first register means having m stages by or into a multiplier or dividend value stored in a second register means having n stages, where $n \geq m$, said registers having input means and output means, comprising in combination:

means for producing a divide signal when a divide operation is to be performed;

complementing means responsive to said divide signal for selectively complementing the signals from the output means of said first register means;

adder means having m stages including a most significant stage and a least significant stage responsive to signals from the output means of said first register means coupled through said complementing means and the signals from the output means of the m most significant stages of said second register means for producing sum signals and a carry-out signal from the most significant stage, and including means for coupling said divide signal to said least significant stage of said adder as a carry-in signal;

means responsive to said divide signal for storing the carry-out signal in the least significant stage of said second register;

means for shifting the contents of said second register to the next less significant stage in the absence of said divide signal and to the next more significant stage in response to said divide signal, said means for shifting including means responsive to the least significant value in said second register for substituting the sum signals for the contents of the m most significant stages of the second register; and control means for timing the shifting means including means responsive to said divide signal for shifting the contents of said second register initially to the next more significant stage and finally to the next less significant stage.

2. A system suitable for deposition on a single integrated circuit chip for selectively multiplying or dividing two operands, comprising in combination:

first, second, and third storage means, each having a plurality of stages for storing operands and results, said first and third storage means initially storing the operands;

control means, including timing means, for supplying a control signal having one value during a divide operation and a different value during a multiply operation;

adder means having a plurality of stages responsive to said third storage means least significant stage and to said control means for adding the contents from corresponding stages of said first and second storage means to produce output signals;

means responsive to said control signal for complementing the operand value from the first storage means as applied to said adder means;

means for coupling said control signal as a carry-in signal to said adder means least significant stage during a divide operation;

means responsive to said control means for storing the output signals from each stage of said adder means in the next lower order stages of said second storage means during a multiply operation and in the next higher order stages of said second stage means during a divide operation;

means responsive to said control means for producing a shift signal to the contents of said third storage means to successively lower order stages during a multiply operation and to succesively higher order stages during a divide operation; and means responsive to said control means for concatenating the least significant stage of said second storage means with the most significant stage of said third storage means to enable shifting the contents of said second and third storage means into one another.

3. The invention as claimed in claim 2 including means responsive to said control means for shifting the contents of said second and third storage means initially to the next higher order stage during a divide operation and finally to the next lower order stage.

4. The system as claimed in claim 3 including means for cascading a plurality of said systems each deposed on a separate chip to operate on arbitrarily long operands including:

command means for producing a command signal in a selected one of said plurality of systems;

first selective bidirectional terminal means responsive to said command signal for coupling said control signal to each one of said plurality of systems;

second selective bidirectional terminal means responsive to said command signal for coupling said shift signal to each one of said plurality of systems; and bidirectional register termination means responsive to said control signal for coupling the least significant stages of said second and third storage means in successively higher order systems to the most significant stages of said second and third storage means, respectively, in adjacent lower order systems to produce second and third storage means of increased capacity.

5. In a binary multiplication system, including first storage means having a plurality of stages for storing a multiplicand value, second storage means having a plurality of stages for storing a partial product value, third storage means having a plurality of stages for storing a multiplier value, adder means responsive to successively more significant multiplier bits for selectively adding the multiplicand value to the partial product value, means for storing the sum bits from said adder means in the next lower order stages of said second storage means if the least significant stage of the third storage means is set, means for shifting said multiplier bits to lower order stages, means for concatenating the least significant stage of said second storage means with the most significant stage of said third storage means so that low order product bits are shifted into said third storage means, the improvement for selectively dividing a dividend value initially stored in said third storage means by a divisor value stored in said first storage means comprising the combination:

operation means for supplying a control signal indicative of a divide operation;

means responsive to said control signal for complementing the divisor value applied to said adder means and for supplying a carry-in signal to said adder's least significant bit position;

means responsive to said control signal for setting the least significant stage of said third storage means in response to a carry-out signal from said adder means;

means responsive to said control signal for shifting said dividend value to the next higher order value as the first step of a divide operation;

means responsive to said operation means and the least significant stage of said third storage means for storing sum bits from said adder means in the next higher order stages of said second storage means when said least significant stage of said third storage means is set and for shifting the second storage means to the next higher order stages when said least significant stage of said third storage means is reset;

means responsive to said control signal for shifting the contents of said third storage means to the next higher order stage; and means responsive to said operation means for shifting said dividend value to the next lower order stage as the final step of a divide operation.

6. A method for performing binary division on a binary dividend having m bits by a binary divisor having n bits, said divisor's n bits being initially aligned with the dividend's most significant n bits comprising the steps of:

1. pre-shifting the dividend bits to the next more significant position;
2. subtracting the divisor bits from the aligned dividend bits;
3. storing the most significant borrow value;
4. shifting the bits of the dividend to the next more significant position if the stored borrow value is one;
5. storing the difference resulting from the subtracting step in the next more significant bit positions of the aligned bits of the dividend and shifting the non-aligned bits of the dividend to the next more significant position if the stored borrow value is zero;
6. repeating steps (2) through (5) a number of times equal to m minus n; and
7. post-shifting the dividend bits to the next less significant position.

7. The method claimed in claim 6 wherein said subtracting step comprises the steps of:
   complementing the divisor value;
   producing a least significant carry-in value;
   adding said complement divisor value, least significant carry-in value, and the aligned portion of the dividend value;
   and wherein said storing step (3) stores the true value of the most significant carry value.

* * * * *

UNITED STATES PATENT OFFICE
CERTIFICATE OF CORRECTION

PATENT NO. : 4,065,666

DATED : December 27, 1977

INVENTOR(S) : Chin Tao Wu

It is certified that error appears in the above-identified patent and that said Letters Patent are hereby corrected as shown below:

Column 10, line 39, after the paragraph insert --Performing eight add-shifts gives:--.

Column 11, line 64, "X" should be --$\bar{X}$--.

Column 11, line 67, "X" should be --$\bar{X}$--.

Column 12, line 3, "X" should be --$\bar{X}$--.

Column 12, line 6, "X" should be --$\bar{X}$--.

Column 12, line 9, "X" should be --$\bar{X}$--.

Column 12, line 12, "X" should be --$\bar{X}$--.

Column 12, line 15, "X" should be --$\bar{X}$--.

Column 12, line 18, "X" should be --$\bar{X}$--.

Column 12, line 20, "X" should be --$\bar{X}$--.

Column 12, line 23, "X" should be --$\bar{X}$--.

UNITED STATES PATENT OFFICE
CERTIFICATE OF CORRECTION

PATENT NO. : 4,065,666

DATED : December 27, 1977

INVENTOR(S) : Chin Tao Wu

It is certified that error appears in the above-identified patent and that said Letters Patent are hereby corrected as shown below:

Column 12, line 26, "X" should be --$\bar{X}$--.

Column 13, line 45, "stage" should be --storage--.

*Signed and Sealed this*

*Twenty-seventh* Day of *June 1978*

[SEAL]

Attest:

RUTH C. MASON
*Attesting Officer*

DONALD W. BANNER
*Commissioner of Patents and Trademarks*